United States Patent [19]
Nishiyama et al.

[11] Patent Number: 5,154,864
[45] Date of Patent: Oct. 13, 1992

[54] PROCESS OF PRODUCING BIODEGRADABLE SHEET FORMED OF CELLULOSE AND CHITOSAN

[75] Inventors: Masashi Nishiyama, Kannonji; Jun Hosokawa, Takamatsu; Kazutoshi Yoshihara, Takamatsu; Takamasa Kubo, Takamatsu; Satoshi Maruyama, Kagawa; Akihiko Ueda, Marugame; Kunio Kanaoka, Sakaide; Kenji Tateishi, Kagawa; Kazuo Kondo, Marugame, all of Japan

[73] Assignees: Director-General of Agency of Industrial Science and Technology; Okura Industrial Co., Ltd., both of Japan

[21] Appl. No.: 744,399

[22] Filed: Aug. 13, 1991

[30] Foreign Application Priority Data

Aug. 22, 1990 [JP] Japan .................................. 2-219118

[51] Int. Cl.$^5$ .......................... B29C 41/50; B29C 47/76
[52] U.S. Cl. ................... 264/102; 264/211.11; 264/211.12; 264/212; 524/13; 524/47
[58] Field of Search ............ 264/101, 102, 204, 207, 264/211.11, 211.12, 212, 217; 524/13, 14, 47; 527/103; 528/501, 502

[56] References Cited

FOREIGN PATENT DOCUMENTS

| 323732 | 7/1989 | European Pat. Off. . |
| 393825 | 10/1990 | European Pat. Off. . |
| 2-6689 | 1/1990 | Japan . |
| 2-200894 | 8/1990 | Japan . |

*Primary Examiner*—Leo B. Tentoni
*Attorney, Agent, or Firm*—Lorusso & Loud

[57] ABSTRACT

A biodegradable sheet is produced from an aqueous dispersion containing finely cut cellulose fibers and chitosan. The dispersion is maintained at a temperature $T_1$ °C. which is within the following range:

$$t \leq T_1 \leq t + 30$$

wherein t is the boiling point (°C.) of water at a given reduced pressure and is continuously introduced into a defoaming zone maintained at the given reduced pressure and at a temperature within the same range as that of $T_1$. In the defoaming zone, the dispersion is formed into a downwardly flowing laminar flow so that air entrapped therein is effectively removed therefrom. The defoamed dispersion is then passed through a die and is molded into a sheet which is subsequently dried.

4 Claims, 1 Drawing Sheet

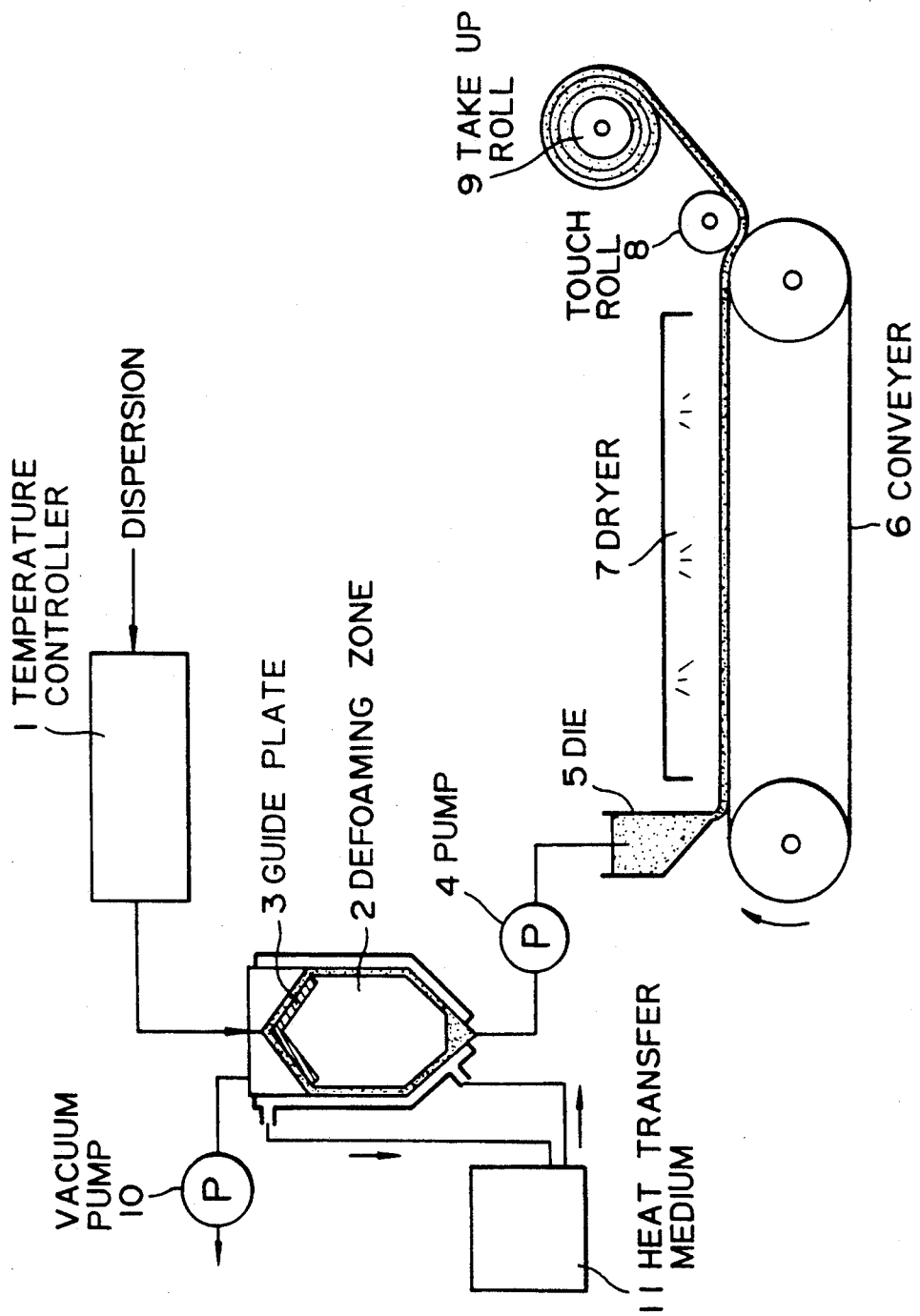

PROCESS OF PRODUCING BIODEGRADABLE SHEET FORMED OF CELLULOSE AND CHITOSAN

BACKGROUND OF THE INVENTION

1. Field of the Invention

This invention relates to a process for the production of a biodegradable sheet formed of chitosan and cellulose.

In view of the recent increasing problems of environmental pollution, the use of biodegradable plastics which are able to be decomposed by microorganisms when left in soil is being encouraged.

Japanese Published Unexamined Patent Application (Tokkyo Kokai) No. Hei-2-6689 discloses a biodegradable composite sheet composed of cellulose and chitosan. Because of its excellent biodegradability and cheapness of its raw materials, this composite sheet will lend itself to a variety of applications for, for example, packaging and farm materials.

However, in order to actually put such a biodegradable sheet into practice, several problems have been found to remain unsolved. Thus, according to the method disclosed in the above Japanese patent publication, the composite sheet is produced by mixing an aqueous acidic solution of chitosan with fine cellulose fibers, shaping the resulting aqueous dispersion into a sheet and drying. Because the aqueous dispersion is viscous, air bubbles are apt to be trapped during the course of the preparation of the dispersion and the air bubbles once entrapped cannot be easily removed. Inclusion of air bubbles into the composite sheet causes deterioration of the mechanical properties, such as tensile strength, of the sheet.

SUMMARY OF THE INVENTION

The present invention has been made on the basis of is aimed at the provision of an effective process which can produce a biodegradable sheet composed of chitosan and cellulose fibers and having good mechanical properties.

In accordance with the present invention there is provided a process for the preparation of a biodegradable sheet, comprising the steps of:

(a) providing an aqueous dispersion having a viscosity of 50–1000 poises and including 100 parts by weight of cellulose fibers having a length of 3 mm or less and a diameter of 50 $\mu$m or less, and 2–100 parts by weight of chitosan, said dispersion being maintained at a temperature $T_1$ °C. which is within the following range:

$$t \leq T_1 \leq t+30$$

wherein t is the boiling point (°C.) of water at a given reduced pressure;

(b) continuously introducing said dispersion having the temperature $T_1$ °C. into a defoaming zone and forming said dispersion into a downwardly flowing laminar flow while maintaining said defoaming zone at said given reduced pressure and at a temperature $T_2$ °C. which is within the following range:

$$t \leq T_2 \leq t+30$$

wherein t is as defined above, thereby to effect defoaming of said dispersion;

(c) continuously discharging the defoamed dispersion from said defoaming zone and passing same through a die so that said dispersion is molded into a sheet; and (d) drying said sheet.

BRIEF DESCRIPTION OF THE DRAWINGS

The present invention will now be described in detail with the sole FIGURE as a schematic illustration of an apparatus suitable for carrying out the process of the present invention.

DESCRIPTION OF THE PREFERRED EMBODIMENTS

In the process according to the present invention an aqueous dispersion containing chitosan and cellulose fibers is used as a raw material for the production of a biodegradable sheet. The aqueous dispersion may be prepared by mixing cellulose fibers having a length of 3 mm or less and a diameter of 50 $\mu$m or less with an aqueous acidic solution of chitosan. The content of chitosan in the dispersion should be 2–100 parts by weight per 100 parts by weight of the cellulose fibers.

Chitosan is a product obtained by deacetylation of chitin contained in mycelia or crust of Crustacea such as crab or lobster. The molecular weight and degree of deacetylation of the chitosan to be used in the present invention are not specifically limited. However, a deacetylation degree of at least 60% is desired for reasons of increased solubility. Since chitosan as such is not soluble in water, chitosan is used in the form of an acid salt, such as hydrochloride or the like inorganic acid salt or formate, acetate, lactate or the like organic acid salt.

Any cellulose fiber may be used for the purpose of the present invention. Examples of suitable cellulose fibers include fibers formed of cellulose, hemicellulose or lignocellulose obtained from wood, straw, cotton, jute, bamboo or bagasse and cellulose produced by bacteria. Beaten fibers with a length of 3 mm or less, preferably 1 mm or less and a diameter of 50 $\mu$m or less, preferably 30 $\mu$m or less are suitably used in the present invention.

The aqueous dispersion may further contain one or more additives such as a filler, a plasticizer, an antifoamant and a colorant. Both organic filler such as starch and inorganic fillers such as silica may be used.

Referring to the FIGURE, the above aqueous dispersion is first introduced into a temperature controller, generally a preheater, where the dispersion is adjusted to a temperature $T_1$ °C. which is within the following range:

$$t \leq T_1 \leq t+30$$

wherein t is the boiling point, in terms of °C., of water at a given reduced pressure.

The resulting dispersion having the temperature $T_1$ °C. is then fed to a defoaming zone 2 which is generally defined in a cylindrical housing chamber provided with a jacket through which a heat transfer medium 11, such as warm water, is recirculated to maintain the inside of the defoaming zone 2 at a temperature $T_2$ °C. which is within the following range:

$$t \leq T_2 \leq t+30$$

wherein t is as defined above. The temperatures $T_1$ and $T_2$ preferably have the following relationship:

$T_1 - 10 \leq T_2 \leq T_1 + 15.$

A vacuum pump 10 is connected to the top of the defoaming zone 2 to maintain the defoaming zone 2 at the abovementioned, given reduced pressure. Preferably, the defoaming zone 2 is maintained at a reduced pressure of 15-250 Torr., more preferably 15-200 Torr.

In an upper portion of the defoaming zone is provided a guide plate member 3 which is so arranged that the aqueous dispersion supplied to the top of the defoaming zone 2 can form a downwardly flowing laminar flow on the inside surface of the defoaming zone 2. As a result of the above construction of the defoaming zone 2, air bubbles contained in the aqueous dispersion are removed during the downward movement of the laminar flow thereof. Such a laminar flow may also be formed by directing the dispersion radially outward from a rotating distributor mounted on the center of the ceiling of a cylindrical housing as the defoaming zone 2. As a consequence of the centrifugal force created by the rotating distributor, the dispersion is fed to the upper portion of the vertical side wall of the cylindrical housing 2 and forms a downwardly flowing liquid film over the surface of the wall.

It is important that the dispersion be maintained at the above-specified temperature in the defoaming zone 2 in order to effect the defoaming within a short period of time while minimizing the evaporation of water. In particular, when the temperature $T_2$ in the defoaming zone 2 is below "t", the defoaming rate becomes undesirably low. On the other hand, when $T_2$ is higher than $(t + 30)$, evaporation of water causes a change in composition of the defoamed dispersion. For the similar reasons, it is also important that the dispersion should be maintained at the above-specified temperature $T_1$ before introduction into the defoaming zone 2.

It is also very important that the dispersion introduced into the defoaming zone should be transformed into downwardly flowing laminar flow in order both to effectively perform the defoaming and to achieve the whole of the process in a continuous mode.

The aqueous dispersion thus defoamed in the defoaming zone 2 is continuously discharged therefrom by a pump 4 and is continuously fed to a die 5. In the die the dispersion is continuously passed by gravity through a die slit 5 and molded into a sheet with a desired thickness on a belt conveyor 6. The die slit has preferably an aperture of 0.5-5 mm. The sheet on the conveyor 6 is continuously conveyed through a dryer 7. The dried sheet or film is removed from the conveyor belt 6 by a touch roll 8 and is taken up by a roll 9.

In order to smoothly effect the molding, it is essential that the raw material aqueous dispersion to be fed to the temperature controller 1 have a viscosity of 50-1000 poises, preferably 100-500 poises. The term "viscosity" used in the present specification is intended to refer to that measured by a B-type viscometer at 23° C. with a rotor revolution speed of 4 rpm. The above viscosity range also plays an important role in the defoaming step. More specifically, a viscosity of below 50 poises is disadvantageous because it is difficult to form a sheet with a uniform thickness. When the viscosity of the dispersion is greater than 1000 poises, on the other hand, it is difficult to effectively defoam the dispersion.

The following examples will further illustrate the present invention.

EXAMPLE 1

Bleached pulp from a needle-leaved tree was beaten in water to obtain a dispersion containing 4% by weight of cellulose fibers with a length of 0.5 mm or less and a diameter of 0.1 $\mu$m or less. The dispersion (100 parts by weight) was then mixed with 20 parts by weight of an aqueous solution containing 4% by weight of an acetic acid salt of chitosan, 3 parts by weight of glycerin as a plasticizer and 190 parts by weight of water to obtain an aqueous dispersion having a viscosity of 140 poises. The dispersion was continuously fed to a preheater and heated to 50° C. Then the dispersion was continuously introduced into a vacuum chamber maintained at a temperature of 50° C. and a pressure of 40 Torr. (the boiling point of water at this pressure is 33° C.) and provided with guide plates so that the dispersion was formed into a laminar flow which flows downward along the inside wall of the vacuum chamber, thereby to effect defoaming. The defoamed dispersion was continuously discharged from the vacuum chamber. The average residence time of the dispersion in the vacuum chamber was controlled to 3 minutes. The discharged dispersion was continuously introduced into a die with a slit size of 2 mm × 150 mm and molded into a sheet. The sheet was continuously fed onto a conveyer belt running at a predetermined speed through a drying oven to effect drying, thereby to obtain a film with a uniform thickness of 50$\mu$m. The film was found not to contain any air bubbles. The appearance and mechanical properties of the film were very good. The extrusion was able to be performed with good moldability. The film was biodegradable.

EXAMPLE 2

Example 1 was repeated in the same manner as described except that the amount of water mixed with the cellulose fibers was decreased from 190 parts by weight to 100 parts by weight (the viscosity of the dispersion was increased from 140 poises to 310 poises), thereby to obtain a biodegradable film having a uniform thickness of 70 $\mu$m and containing no air bubbles. The appearance and mechanical properties of the film were very good. The extrusion was able to be performed with good moldability.

EXAMPLE 3

Example 1 was repeated in the same manner as described except that the preheating temperature was lowered to 30° C. and that the temperature and pressure in the vacuum chamber were lowered to 30° C. and 20 Torr. (the boiling point of water at this pressure is 21° C.), respectively, thereby obtaining a biodegradable film with a uniform thickness of 50 $\mu$m and containing no air bubbles. The appearance and mechanical properties of the film were very good. The extrusion was able to be performed with good moldability.

COMPARATIVE EXAMPLE 1

Example 1 was performed in the same manner as described except that the dispersion produced was introduced as such without being preheated. The film obtained had a uniform thickness of 50 $\mu$m and contained air bubbles. The mechanical properties of the film were not satisfactory.

COMPARATIVE EXAMPLE 2

Example 1 was repeated in the same manner as described except that the preheating temperature was increased to 70° C. and that the temperature in the vacuum chamber was also increased to 70° C. thereby obtaining a biodegradable film with a uniform thickness of 50 μm and containing no air bubbles. However, the evaporation of water occurred significantly in the vacuum chamber to cause partial concentration of the dispersion, so that the resulting film was poor in appearance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the preparation of a biodegradable sheet, comprising the steps of:
   (a) providing an aqueous dispersion including air bubbles and having a viscosity of 50–1000 poises and including 100 parts by weight of cellulose fiber shaving a maximum length of 3 mm and a maximum diameter of 50 μ, and 2–100 parts by weight of chitosan, said dispersion being maintained at a temperature $T_1$ °C. which is with the following range:

$$t \leq T_1 \leq t+30$$

wherein t is the boiling point (° C.) of water at a given reduced pressure;
   (b) continuously introducing said dispersion having the temperature $T_1$ °C. into a defoaming zone and forming said dispersion into a downwardly flowing laminar flow while maintaining said defoaming zone at said given reduced pressure and at a temperature $T_2$ °C. which is within the following range:

$$t \leq T_2 \leq t+30$$

wherein t is as defined above, to remove said air bubbles and thereby effect defoaming of said dispersion;
   (c) continuously discharging the defoamed dispersion from said defoaming zone and passing same through a die so that said dispersion is molded into a sheet; and
   (d) drying said sheet.

2. A process as claimed in claim 1, wherein said aqueous dispersion in step (a) has a viscosity of 100–500 poses.

3. A process as claimed in claim 1, wherein said given reduced pressure is within the range of 15–250 Torr.

4. A process as claimed in claim 1, wherein said temperatures $T_1$ and $T_2$ have the following relationship:

$$T_1 - 10 \leq T_2 \leq T_1 + 15.$$

* * * * *

UNITED STATES PATENT AND TRADEMARK OFFICE
CERTIFICATE OF CORRECTION

PATENT NO. : 5,154,864
DATED : October 13, 1992
INVENTOR(S) : NISHIYAMA et al It is certified that error appears in the above-identified patent and that said Letters Patent is hereby corrected as shown below:

Col. 2, line 44, delete "filler" and insert --fillers--.

Col. 5, line 28, delete "fiber" and insert --fibers--;

line 29, delete "shaving" insert --having--; and line 32, delete "with" and insert --within--.

Signed and Sealed this

Seventh Day of December, 1993

Attest:

BRUCE LEHMAN

Attesting Officer      Commissioner of Patents and Trademarks